US012793422B2

(12) United States Patent
Slawek et al.

(10) Patent No.: US 12,793,422 B2
(45) Date of Patent: Nov. 10, 2026

(54) METHOD AND APPARATUS FOR IDENTIFYING ITEMS UNDER A PERSON'S CLOTHING

(71) Applicant: MOTOROLA SOLUTIONS, INC., Chicago, IL (US)

(72) Inventors: Mateusz Slawek, Cracow (PL); Mariusz Jedut, Cracow (PL); Bartosz J Zielonka, Pozna (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 566 days.

(21) Appl. No.: 18/056,275

(22) Filed: Nov. 17, 2022

(65) Prior Publication Data

US 2024/0169736 A1 May 23, 2024

(51) Int. Cl.

*G06V 20/52* (2022.01)
*G06T 11/00* (2026.01)
*G06V 10/764* (2022.01)

(52) U.S. Cl.

CPC .............. *G06V 20/52* (2022.01); *G06T 11/00* (2013.01); *G06V 10/764* (2022.01); *G06T 2200/24* (2013.01); *G06V 2201/10* (2022.01)

(58) Field of Classification Search

CPC .. G06V 20/52; G06V 10/764; G06V 2201/10; G06V 2201/05; G06T 2200/24

See application file for complete search history.

(56) References Cited

U.S. PATENT DOCUMENTS

| | | | |
|---|---|---|---|
| 6,359,582 B1 | 3/2002 | Macaleese et al. | |
| 8,116,575 B1 | 2/2012 | Saisan et al. | |
| 2020/0320371 A1 | 10/2020 | Baker et al. | |
| 2022/0301316 A1 | 9/2022 | Morimoto et al. | |
| 2022/0334243 A1* | 10/2022 | DeAngelus | G06V 10/454 |

FOREIGN PATENT DOCUMENTS

| | | | | |
|---|---|---|---|---|
| CN | 105866771 A * | 8/2016 | | |
| JP | 2021128145 A * | 9/2021 | G01N 21/3581 | |
| KR | 101879735 B1 | 7/2018 | | |

OTHER PUBLICATIONS

Sun, Jiuai, et al. "Concealed object perception and recognition using a photometric stereo strategy." International Conference on Advanced Concepts for Intelligent Vision Systems. Berlin, Heidelberg: Springer Berlin Heidelberg, 2009. (Year: 2009).*

(Continued)

*Primary Examiner* — Emily C Terrell
*Assistant Examiner* — Jacqueline R Zak

(57) ABSTRACT

A method and apparatus for identifying an object type under a person's clothing is provided herein. During operation, an anomaly is detected and imaged by a camera based on a wrinkle pattern of a person's clothing. A distance, angle, and height are determined between the camera and the anomaly. Once the distance, angle, and height are determined, multiple images are generated that model various weapons under cloth for the particular distance, angle, and height. The various generated images are compared to an image of the detected anomaly to determine an image having a best match.

13 Claims, 7 Drawing Sheets

(56) References Cited

OTHER PUBLICATIONS

R. Khirodkar, D. Yoo and K. Kitani, "Domain Randomization for Scene-Specific Car Detection and Pose Estimation," 2019 IEEE Winter Conference on Applications of Computer Vision (WACV), 2019, pp. 1932-1940, doi: 10.1109/WACV.2019.00210.

G. Georgakis, A. Mousavian, A. Berg, and J. Kosecka, "Synthesizing Training Data for Object Detection in Indoor Scenes", Arxiv 2017, arXiv:1702.07836, Feb. 8, 2017, all pages.

Sun Jiuai et al.: "Concealed Object Perception and Recognition Using a Photometric Stereo Strategy", Sep. 28, 2009 (Sep. 28, 2009), Sat 2015 18th International Conference, Springer, Berlin, Heidelberg, XP047400120, ISBN: 978-3-540-74549-5 pp. 445-455.

The International Search Report and The Written Opinion, corresponding patent application No. PCT/US2023/035913, filed: Oct. 25, 2023, mailed Feb. 9, 2024, all pages.

* cited by examiner

METHOD AND APPARATUS FOR IDENTIFYING ITEMS UNDER A PERSON'S CLOTHING

BACKGROUND OF THE INVENTION

Traditional techniques for identifying items under a person's clothing rely on metal detectors, however their accuracy is limited with the advent of modern non-metallic materials and 3D printing technology. Additionally, while metal detectors can determine if a metallic object exists under clothing, it cannot determine the type of object that exists under the clothing. Current methods that allow for discovery of the types of objects under clothing are inconvenient and potentially invasive (pat-downs, scanners, . . . , etc.). It would be beneficial if a technique could be utilized to determine a type of object that exists under a person's clothing that is more accurate than a metal detector, yet, less intrusive than pat-downs and scanners.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for identifying an object type under a person's clothing is provided herein. During operation, an anomaly is detected and imaged by a camera based on a wrinkle pattern of a person's clothing. A distance, angle, and height are determined between the camera and the anomaly. Once the distance, angle, and height are determined, multiple images are generated that model various weapons under cloth for the particular distance, angle, and height. The various generated images are compared to an image of the detected anomaly to determine an image having a best match.

It should be noted that all "images" described herein (e.g., the various generated images and the image of the detected anomaly) comprise digital images. A digital image is an image composed of picture elements, also known as pixels, each with finite, discrete quantities of numeric representation for its intensity or gray level that is an output from its two-dimensional functions fed as input by its spatial coordinates denoted with x, y on the x-axis and y-axis, respectively. Depending on whether the image resolution is fixed, it may be of vector or raster type. By itself, the term "digital image" usually refers to raster images or bitmapped images (as opposed to vector images).

Figure 1:
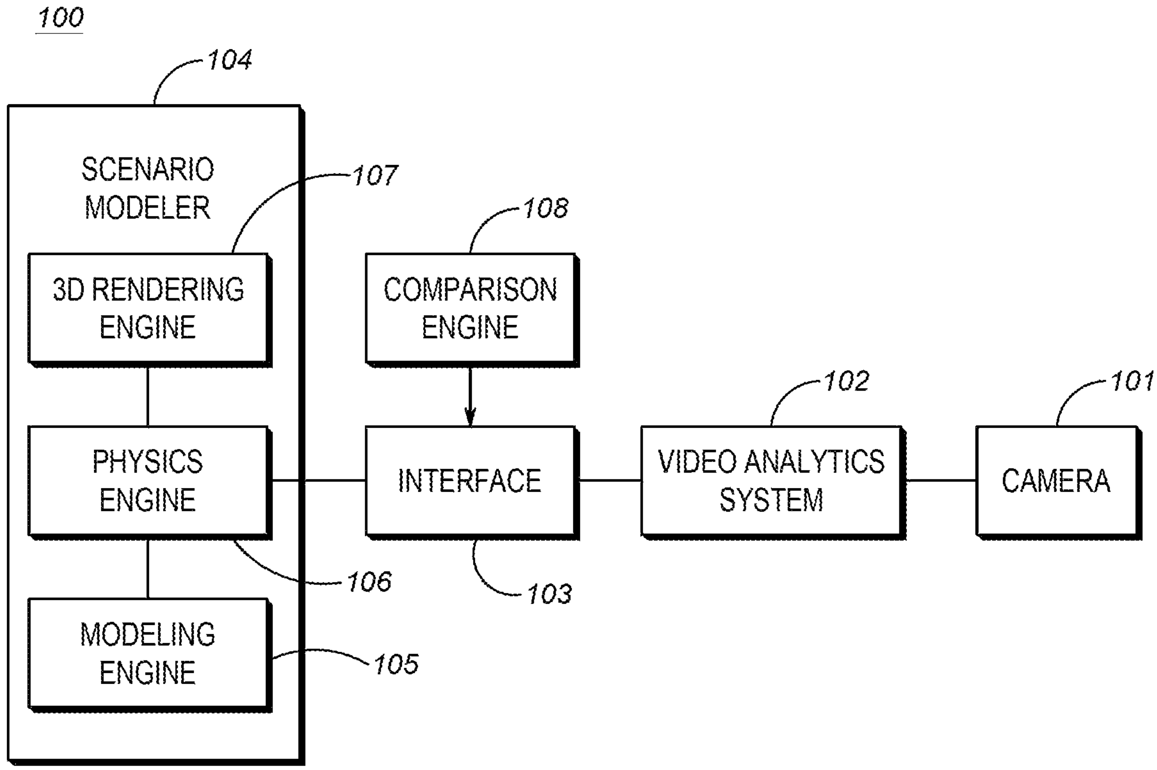
FIG. 1 is a block diagram of an apparatus for identifying an object under a person's clothing.
Figure 2:
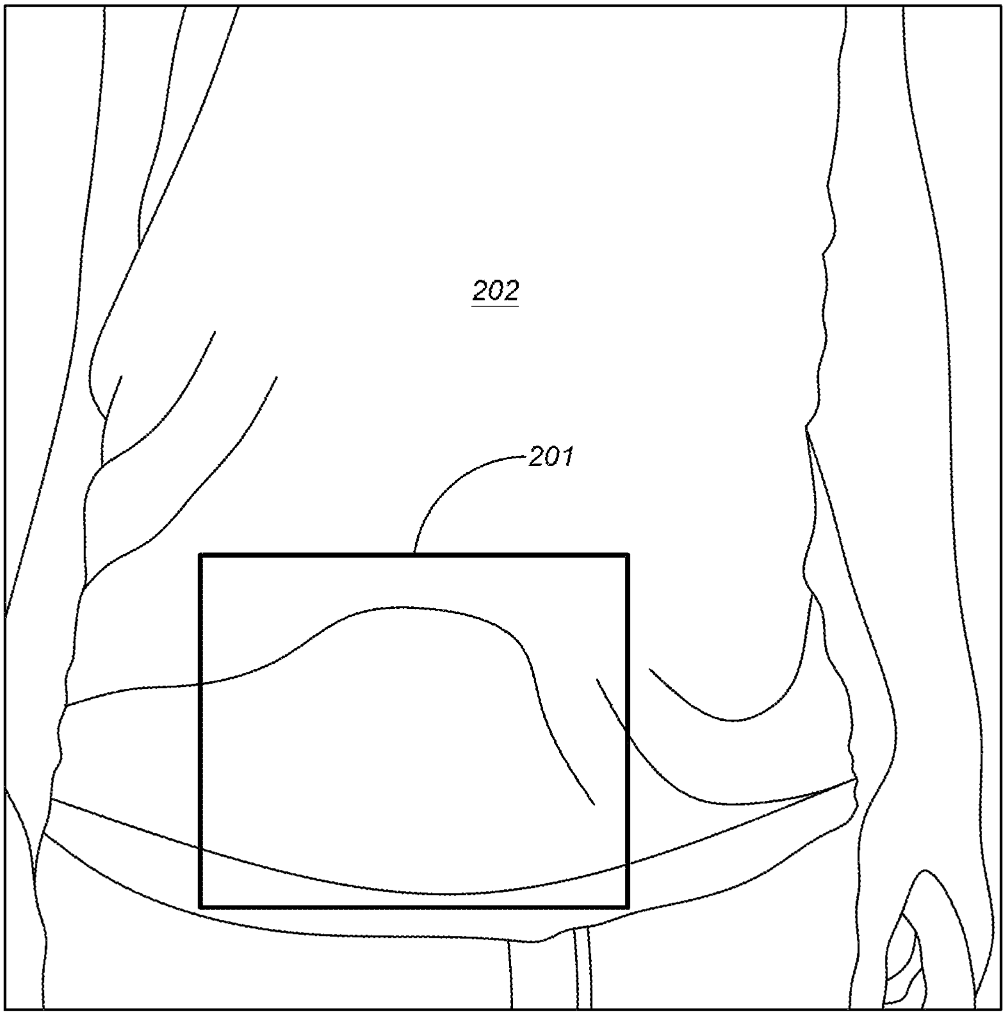
FIG. 2 shows a scene with an anomaly under a person's shirt.

FIG. 1 illustrates apparatus 100 for identifying an object type under a person's clothing when an anomaly in the person's clothing is detected. Such an anomaly is shown in FIG. 2 as anomaly 201 that exists underneath a tee shirt 202 worn by a person. Apparatus 100 comprises camera 101, video analytics system 102, interface 103, scenario modeler 104, and comparison engine 108. During operation an image/video of shirt 202 is produced by camera 101 using a combination of visual imaging, IR emission (thermal vision) and/or radiowave reflection analysis. Camera 101 is either directly connected to video analytics system 102, or attached (i.e., connected) to system 102 through a network (not shown in FIG. 1), and provides a video and/or audio feed to video analytics system 102. Camera 101 may also be mobile, such as body worn camera or vehicle based. Camera 101 captures a sequence of video frames (i.e., a sequence of one or more still images), with optional accompanying audio, in a digital format. It should be noted that the term video is meant to encompass both video and audio or simply video only. However, one of ordinary skill in the art will recognize that audio (without accompanying video) may be forwarded as described herein.

The image/video of shirt 202 is provided to video analytics system 102. In the current embodiment of the present invention, video analytics system 102, such as a "Evolv Express" manufactured by Evolve technology is utilized to detect anomaly 201. In alternate embodiments of the present invention, video analytics systems such as Athena Inc. Security Gun Detection System or ViewScan's Concealed Weapons Detection can be utilized to detect such anomalies. Anomaly detection via video analytics systems is described in detail in the paper entitled, Identifications of Concealed Weapon in a Human Body by Prof. Samir K. Bandyopadhyay, Department of Computer Science and Engineer, University of Calcutta.

Generating Images of Material with Various Weapons Underneath

Figure 3:
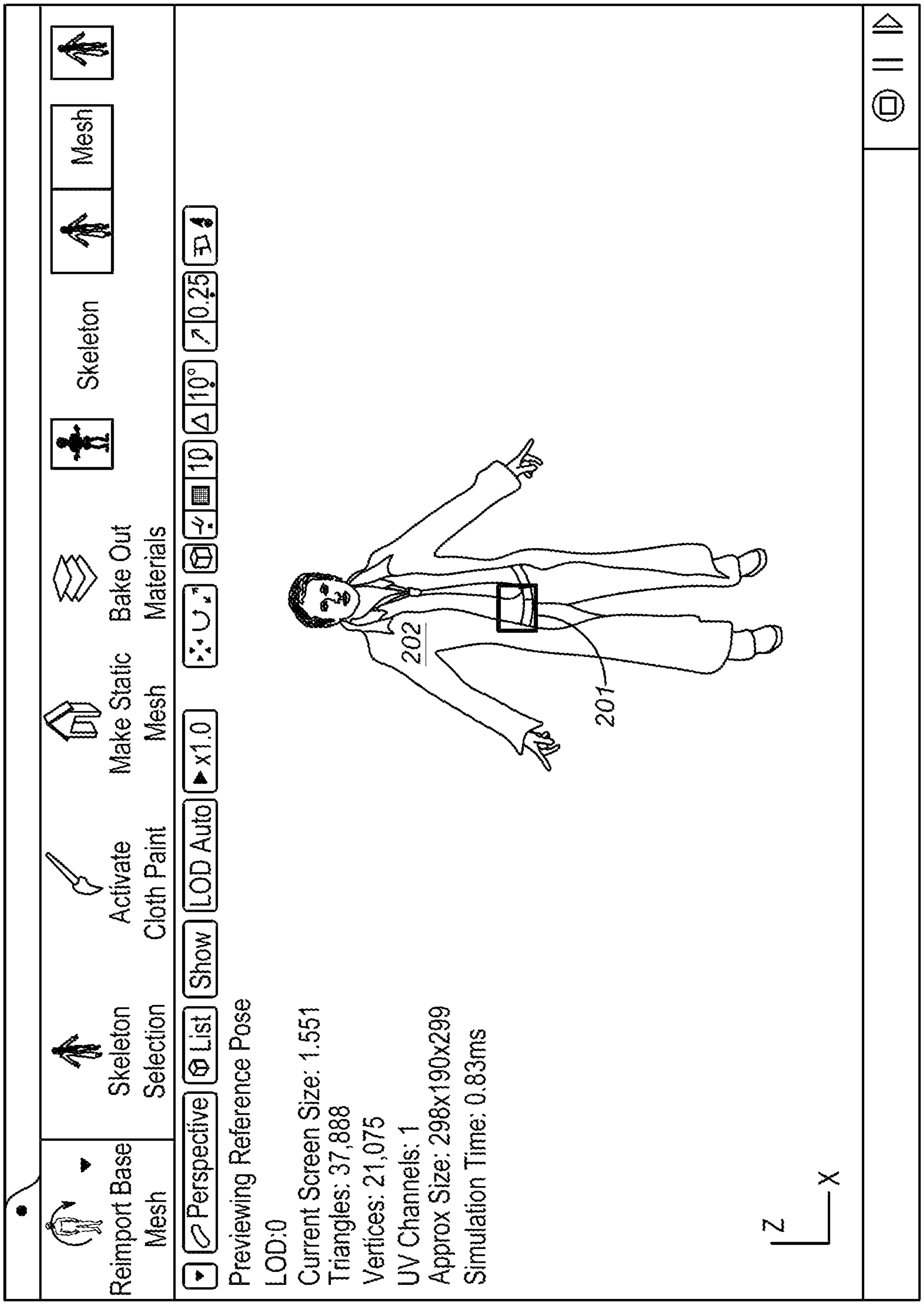
FIG. 3 illustrates a representation of the scene in FIG. 1.
Figure 6:
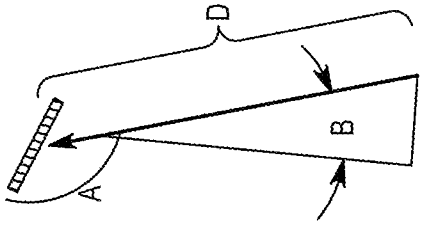
FIG. 6 illustrates a spatial representation between a camera and the anomaly.

Once an anomaly is detected by video analytics system 102, the video analytics system determines information, such as a distance to the anomaly and an angle to the anomaly. This is illustrated in FIG. 3 showing the person's 202 orientation with respect to the camera that took the image shown in FIG. 2. Interface 103 creates metadata of the information and passes the metadata to physics engine 106. Physics engine 106 (as part of scenario modeler 104) then receives the metadata and generates images of various cloths or materials with various weapons underneath.

Physics engine 106 comprises a software program that is used to simulate the physical environment, and the cloth's interaction with the physical environment. In this situation a physics engine such one available with NVIDIA's Gameworks simulates the cloth covering the anomaly using the metadata provided by interface 103. It should be noted that the physics engine does not take part in capturing environmental parameters or images of anomaly 201. Instead, interface 103 provides these parameters as metadata.

Figure 4:
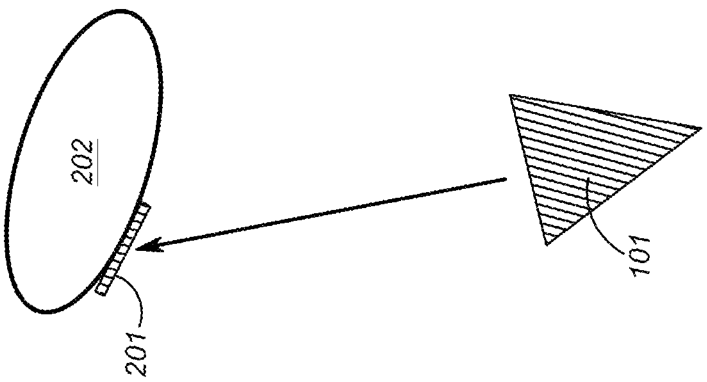
FIG. 4 illustrates a spatial representation between a camera and the anomaly.

As shown in FIG. 4, various angles and distances between camera 101 and anomaly 201 exist and are determined by video analytics system 102. These are output to interface 103 which forwards the various angles and distances (along with an image of the anomaly) to physics engine 106 as metadata. For example, as shown in FIG. 4, a distance (d) between camera 101 anomaly 201 is provided within the metadata, along with an orientation angle (a) that is a representation of an angle that exists between a line of sight of camera 101 and a tangent that exists at the anomaly site on a person. A second angle (b) may be provided that represents an angle between camera 101 and the anomaly 201 that is representative of a height above or below anomaly 201.

Figure 5:
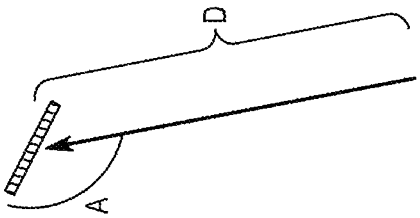
FIG. 5 illustrates a spatial representation between a camera and the anomaly.

Generating the Various Images for the Suspected Anomaly in a Virtual Environment As discussed above, physics engine 106 (as part of scenario modeler 104) is utilized to generate images of various types of cloth (e.g., cotton t-shirts, coats, jeans, . . . , etc.) covering various items (e.g., knives, guns, clubs, wallets, . . . , etc.). The various generated images (modeled scenarios) are created through the use of 3d rendering engine 107 along with (traditional modeling engines 105 like Unreal Engine, nVidia Omniverse or neural rendering engines like nVidia's Instant NeRF) equipped with physics engine 106. Scenario modeler 104 (comprising 3d rendering engine 107, physics engine 106, and modeling engines 105) is connected to video analytics system 102 by interface 103 that receives the generated images from scenario modeler 104. In other words, interface 103 provides metadata to scenario modeler 104, and receives generated images from scenario modeler 104 in response. The metadata includes at least some of the positioning information described above in FIGS. 3, 4, and 5, and may include additional metadata such as a predicted type of the object, its size and characteristics, lighting information, etc. Based on this data, interface 103 generates a request to scenario modeler 104 to provide generated images that best represent an original image taken of the anomaly by camera 101. In an alternate embodiment, interface 103 may generate multiple requests for various hypotheses such as gun under jeans, gun under coat, gun under cotton tee shirt, knife under jeans, knife under coat, knife under cotton tee shirt, mobile phone under jeans . . . , etc. With each request, scenario modeler 104 generates an image of the anomaly based on the metadata along with the hypothetical object placed under clothing. Scenario modeler 104 outputs a plurality generated images (from the same camera angles, distances, . . . , etc.) to comparison engine 108 for comparison with the original image. For example, the generated images may comprise best approximations of what shirt 202 would appear like with various objects underneath (e.g., objects like, a wallet, a gun, a knife, a fanny pack, . . . , etc.).

Comparing the Generated Images to the Original Image of the Anomaly in Order to Choose a Bet Match As discussed above, the output of scenario modeler 104 comprises a plurality of generated images of various cloths (e.g., shirt 202) with various items underneath, viewed at the same angles and distance as the original image provided to the scenario modeler. Because the generated images attempt to recreate the original's environment (camera angle, position, lighting, etc.), traditional, pixel-based comparison methods are utilized by comparison engine 108 to assess the model. The comparison methods calculate a statistical differences between the various generated images and the original image. Such comparison methods include, but are not limited to a mean-square error comparison, a structural simulation similarity index measure, . . . , etc. The aforementioned comparison algorithms return a numerical value for each generated image that can be used to determine a best match (i.e. the generated image with the lowest Mean Square Error value is the most similar). Multiple algorithms may be used and the results averaged for increased confidence. The output of the comparison engine may comprise the best generated image generated and information on what object was modeled in the generated image (e.g., gun under cotton).

With the above in mind, apparatus 100 comprises a camera configured to generate an image of an anomaly, wherein the anomaly comprises an object under fabric, a video analytics system configured to receive the image of the anomaly and output at least an angle from the camera to the anomaly, an interface configured to receive the angle and create metadata comprising the angle, output the metadata along with the image, a scenario modeler configured to receive the image and the metadata and output multiple generated images, wherein the multiple generated images each comprise a different scenario of an object under clothing, and a comparison engine configured to receive the image and the multiple generated images and determine a best generated image from the multiple generated images.

Although not shown in FIG. 1, a graphical user interface may be provided and configured to display a type of object modeled in the best generated image.

Figure 7:
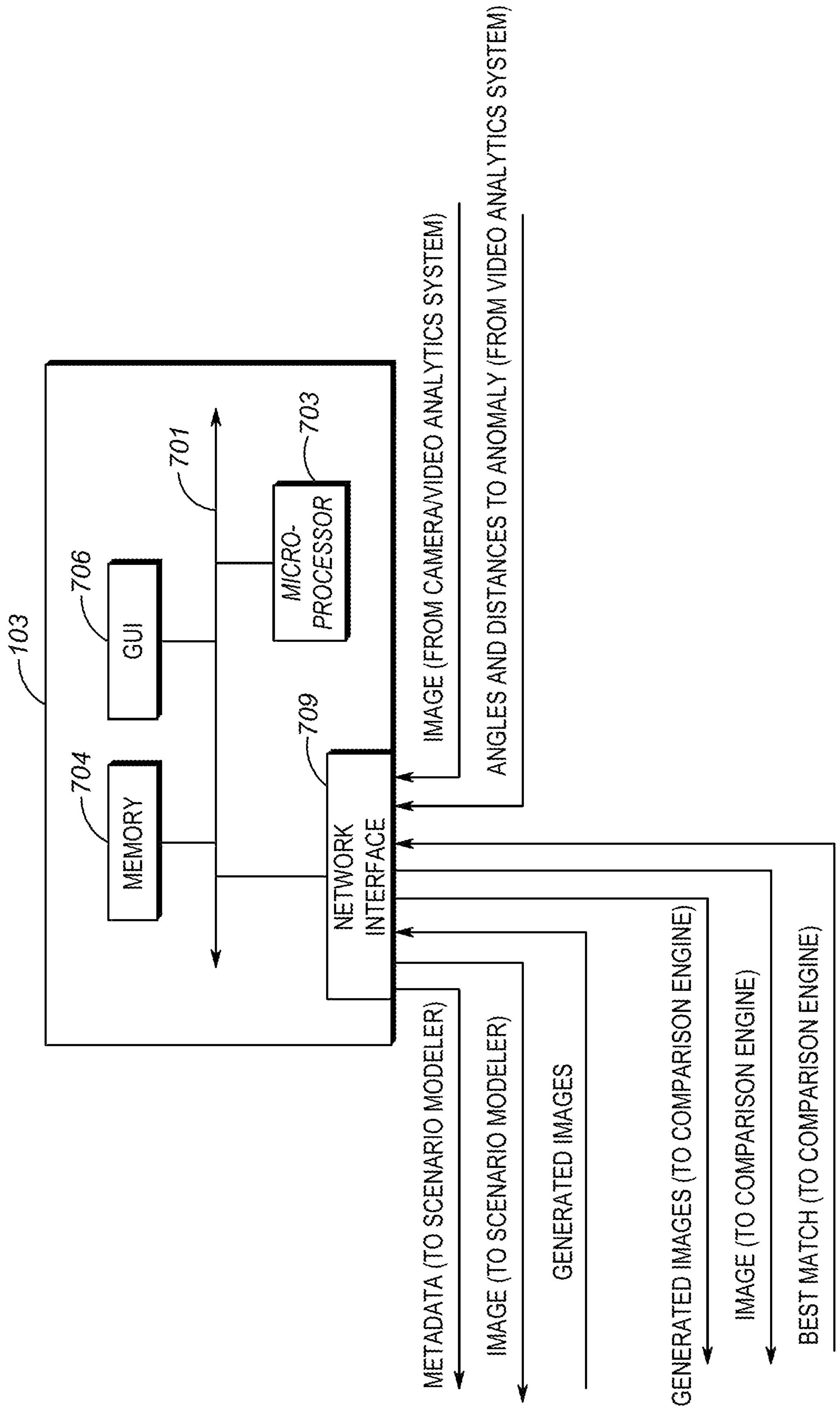
FIG. 7 is a block diagram of the interface of FIG. 1.

FIG. 7 is a block diagram of interface 103. Interface 103 may include various components connected by bus 701. Such components include, but are not limited to logic circuitry 703, memory 704, graphical user interface 706, and network interface 709. Hardware processor/microprocessor (logic circuitry) 703 comprises one or more central processing units (CPUs) or other processing circuitry able to provide any of the functionality described herein when running instructions. Logic circuitry 703 may be connected to memory 704 that may include a non-transitory machine-readable medium on which is stored one or more sets of instructions. The instructions stored in memory 704 may enable interface 103 to operate in any manner thus programmed, such as the functionality described specifically herein, when logic circuitry 703 executes the instructions. The machine-readable medium 704 may be stored as a single medium or in multiple media, in a centralized or distributed manner, or in the cloud. In some embodiments, instructions may further be transmitted or received over a communications network via a network interface (not shown) utilizing any one of a number of transfer protocols (e.g., frame relay, internet protocol (IP), transmission control protocol (TCP), user datagram protocol (UDP), hypertext transfer protocol (HTTP), etc.). In addition to instructions for operation, memory 704 is also configured to images received from cameras along with generated images received from scenario modeler. Metadata is also stored in memory 704.

Graphical-user interface 706 provides a man/machine interface for displaying images (actual and generated) along with information on what generated image is a best approximation of the actual image, along with what was modeled (e.g., gun under tee shirt). Part of the input from the user may comprise information on problems fixed by an update.

.Network interface 709 is provided, and comprises elements including processing, modulating, and transceiver elements that are operable in accordance with any one or more standard or proprietary wired or wireless interfaces, wherein some of the functionality of the processing, modulating, and transceiver elements may be performed by means of the logic circuitry 703 through programmed logic such as software applications or firmware stored on the storage component 704 or through hardware. Examples of network interfaces (wired or wireless) include Ethernet, T1, USB interfaces, IEEE 802.11, 5g, etc. Network interface 709 is utilized by logic circuitry 703 to communicate with any scenario modeler 104 and video analytics system 102.

During operation logic circuitry 703 receives an image from a camera via video analytics system 102. Along with the image, video analytics system provides to logic circuitry 703, the various distances and angles between the camera and the anomaly.

Logic circuitry then creates metadata comprising the various distances and angles and provides the metadata along with the image received from the camera to scenario modeler 104. In response, scenario modeler 104 provides generated images to logic circuitry 703. Along with each generated image, scenario modeler provides information on what was modeled to produce the generated image (e.g., knife under jeans).

These generated images are then provided by logic circuitry 703 to comparison engine 108 along with the original image provided to the scenario modeler. In response, logic circuitry 703 receives a best match, which comprises a generated image that best matches with the image provided the comparison engine. Logic circuitry 703 then provides this information to GUI 706, which displays the image, best matching generated image, along with what was modeled in the best matching generated image.

With the above in mind, interface shown in FIG. 7 comprises logic circuitry configured to receive an image of the anomaly from the camera, receive the angles and distances between the anomaly and a camera, create metadata from the angles and distances between the anomaly and the camera, output the metadata to a scenario modeler, output the image to the scenario modeler, receive generated images from the scenario modeler, send the generated images to a comparison engine, send the image of the anomaly to the comparison engine, and receive an identity of a best generated image from the scenario modeler. A graphical user interface is provided and configured to display modeling parameters used for the best generated image.

The graphical user interface may be additionally configured to display the image of the anomaly and the best generated image. Additionally, the modeling parameters comprise a type of object and a type of clothing.

Figure 8:
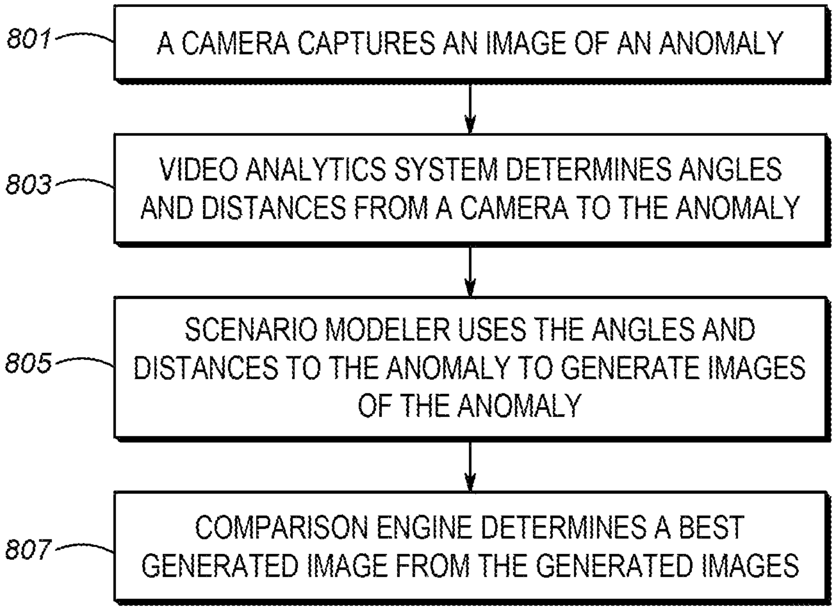
FIG. 8 is a flow chart showing operation of the apparatus of FIG. 1.

FIG. 8 is a flow chart showing operation of the apparatus shown in FIG. 1. The logic flow begins at step 801 where a camera captures an image of an anomaly, wherein the anomaly comprises an object under fabric. At step 803 video analytics system 102 determines angles and distances from a camera to the anomaly. The logic flow continues to step 805 where scenario modeler 104 uses the angles and distances to the anomaly to generate images of the anomaly, wherein the generated images of the anomaly are modeled with various items under various types of clothing. At step 807 comparison engine 108 determines a best generated image from the generated images, wherein the best generated image is an image from the generated images that best fits the captured image of the anomaly.

Figure 9:
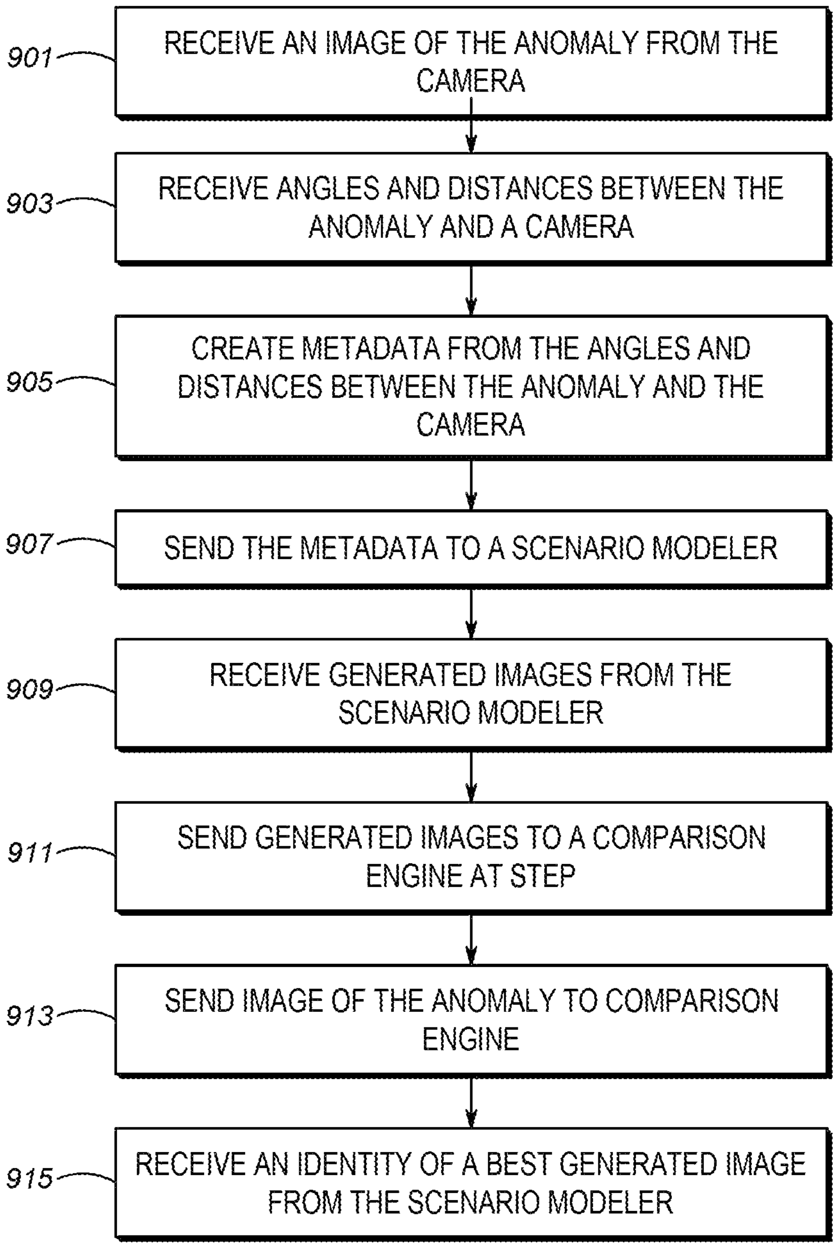
FIG. 9 is a flow chart showing operation of the interface of FIG. 7.

FIG. 9 is a flow chart showing operation of the interface shown in FIG. 7. The logic flow begins at step 901 where interface 103 receives an image of the anomaly from the camera. At step 903, interface 103 receives angles and distances between the anomaly and a camera. At step 905, interface 103 creates metadata from the angles and distances between the anomaly and the camera and sends the metadata to a scenario modeler (step 907). In response generated images are received from the scenario modeler (step 909). The generated images are sent to a comparison engine at step 911 along with the image of the anomaly (step 913). In response, an identity of a best generated image is received from the scenario modeler at step 915.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:

a camera configured to provide an image of an anomaly, wherein the anomaly comprises an object under fabric;

a video analytics system configured to receive the image of the anomaly and output at least an angle from the camera to the anomaly;

an interface configured to receive the angle and create metadata comprising the angle, and output the metadata along with the image;

a scenario modeler configured to receive the image and the metadata and output multiple generated images based on the metadata, wherein the multiple generated images each comprise a different scenario of an object under clothing in a physical environment simulated by a 3D rendering engine of the scenario modeler according to the metadata for comparison with the image of the anomaly;

a comparison engine configured to receive the image and the multiple generated images and determine a best generated image from the multiple generated images; and wherein the apparatus is configured to identify, based on a type of object modeled in the best generated image, an object type of the object under the fabric in the image of the anomaly.

2. The apparatus of claim 1 further comprising:

a graphical user interface configured to display the type of object modeled in the best generated image.

3. A method comprising the steps of:

capturing an image of an anomaly, wherein the anomaly comprises an object under fabric;

determining angles and distances from a camera to the anomaly;

using the angles and distances to the anomaly to generate images of the anomaly in a simulated physical environment, wherein the generated images of the anomaly are modeled with different scenarios of various items under various types of clothing with a 3D rendering engine to simulate interaction with the physical environment;

determining a best generated image from the generated images, wherein the best generated image is an image from the generated images that best fits the captured image of the anomaly;

displaying modeling parameters used for the best generated image; and identifying, based on a type of object modeled in the best generated image, an object type of the object under the fabric in the image of the anomaly.

4. The method of claim 3 wherein the modeling parameters comprises a particular item under a particular type of clothing.

5. The method of claim 3 wherein the anomaly comprises a weapon under clothing.

6. The method of claim 3 wherein the step of determining the best generated image comprises the step of performing a pixel-based comparison method, a mean-square error comparison, or a structural simulation similarity index measure.

7. The method of claim 3 further comprising the step of:

displaying the image of the anomaly and the best generated image.

8. An interface comprising:

logic circuitry configured to:

receive an image of an anomaly from a camera;

receive angles and distances between the anomaly and the camera;

create metadata from the angles and distances between the anomaly and the camera;

output the metadata to a scenario modeler that generates a simulation of the anomaly interacting with a physical environment simulated by a 3D rendering engine of the scenario modeler according to the metadata;

output the image to the scenario modeler;

receive generated images from the scenario modeler, wherein the generated images each comprise a different scenario of an object under clothing in the physical environment;

send the generated images to a comparison engine;

send the image of the anomaly to the comparison engine;

receive an identity of a best generated image from the scenario modeler; and identify, based on a type of object modeled in the best generated image, an object type depicted in the image of the anomaly;

a graphical user interface configured to display modeling parameters used for the best generated image.

9. The interface of claim 8 wherein the graphical user interface is additionally configured to display the image of the anomaly and the best generated image.

10. The interface of claim 8 wherein the modeling parameters comprise the type of object and a type of clothing.

11. A method comprising the steps of:

receiving an image of an anomaly from a camera;

receiving angles and distances between the anomaly and the camera;

creating metadata from the angles and distances between the anomaly and the camera;

sending the metadata to a scenario modeler that generates a simulation of the anomaly interacting with a physical environment simulated by a 3D rendering engine of the scenario modeler according to the metadata;

receiving generated images from the scenario modeler, wherein the generated images each comprise a different scenario of an object under clothing in the physical environment;

sending the generated images to a comparison engine;

sending the image of the anomaly to the comparison engine;

receiving an identity of a best generated image from the scenario modeler;

identifying, based on a type of object modeled in the best generated image, an object type depicted in the image of the anomaly; and displaying modeling parameters used for the best generated image.

12. The method of claim 11 further comprising the step of:

displaying the image of the anomaly and the best generated image.

13. The method of claim 11, wherein the modeling parameters comprise the type of object and a type of clothing.

* * * * *